United States Patent

Kubota et al.

Patent Number: 5,822,287
Date of Patent: Oct. 13, 1998

[54] OPTICAL RECORDING METHOD, OPTICAL RECORDING APPARATUS AND OPTICAL RECORDING MEDIUM

[75] Inventors: Shigeo Kubota; Michio Oka, both of Kanagawa, Japan

[73] Assignee: Sony Corporation, Tokyo, Japan

[21] Appl. No.: 648,147

[22] PCT Filed: Sep. 20, 1995

[86] PCT No.: PCT/JP95/01895

§ 371 Date: Jun. 5, 1996

§ 102(e) Date: Jun. 5, 1996

[87] PCT Pub. No.: WO96/10250

PCT Pub. Date: Apr. 4, 1996

[30] Foreign Application Priority Data

Sep. 27, 1994 [JP] Japan ..................... 6-231215

[51] Int. Cl.⁶ ........................................ G11B 7/00
[52] U.S. Cl. ............. 369/44.38; 369/100; 369/44.26; 369/275.3
[58] Field of Search ............... 369/44.37, 44.38, 369/54, 58, 52, 108, 121, 100, 116, 275.4, 47, 44.26

[56] References Cited

U.S. PATENT DOCUMENTS

| 5,235,582 | 8/1993 | Taniguchi et al. | 369/108 |
| 5,325,348 | 6/1994 | Maeda et al. | 369/100 |
| 5,400,319 | 3/1995 | Fite et al. | 369/275.5 |

FOREIGN PATENT DOCUMENTS

| 0329122 A2 | 8/1989 | European Pat. Off. . |
| 0496632 A1 | 1/1992 | European Pat. Off. . |
| 4321799 C1 | 11/1994 | Germany . |
| 4403171 A1 | 8/1995 | Germany . |
| 62-5680 | 1/1987 | Japan . |
| 1-260642 | 10/1989 | Japan . |
| 3-238681 | 10/1991 | Japan . |
| 4-340448 | 11/1992 | Japan . |
| 5-225582 | 9/1993 | Japan . |
| 7-169187 | 7/1995 | Japan . |

OTHER PUBLICATIONS

Patent Abstracts of Japan, vol. 18, No. 417 (P–1781), Aug. 4, 1994, JP–A–06 124474, Victor Co of Japan, May 6, 1994 *abstract*.

Database WPI, Week 9125, Derwent Publications Ltd., London, GB; JP–A–03 110193, Toa Gosei Chem Ind Ltd, May 10, 1991 *abstract*.

*Primary Examiner*—Thang V. Tran
*Attorney, Agent, or Firm*—Limbach & Limbach L.L.P.

[57] ABSTRACT

The UV laser light outgoing from a UV laser light source 1 is modulated in intensity by a light modulator 2 in accordance with the subsidiary information so as to fall on a mirror 14 via lenses 3, 4, a phase diffraction lattice 5 and a half mirror 11. The UV laser light is then reflected by the mirror 14 and condensed by an objective lens 6 so as to be radiated on an optical disc 8. The UV laser light outgoing from the UV laser light source 1 falls on a phase diffraction lattice via a light modulator 2 and lenses 3 and 4 so as to be radiated on the optical disc 8 via the half mirror 11, mirror 14 and the objective lens 6. On the other hand, the reflected light of the visible laser light reflected by the optical disc 8 falls on the half mirror 11 via the objective lens 6 and the mirror 14 so as to be reflected by the half mirror 11 to fall on a photodetector 13 via a cylindrical lens 12. By effecting focusing control and tracking control based upon an output signal of the photodetector 13, a light spot of the UV laser may be formed at a precise position in the subsidiary information recording area for correctly recording the subsidiary information.

15 Claims, 7 Drawing Sheets

TAGENTIAL  1.00 RELATIVE  SAGITIAL
         FIELD HEIGHT
1.00        (0.500°)      1.00

0.00 RELATIVE
         FIELD HEIGHT
1.00        (0.000°)      1.00

OPTICAL RECORDING METHOD, OPTICAL RECORDING APPARATUS AND OPTICAL RECORDING MEDIUM

TECHNICAL FIELD

This invention relates to an optical recording method for recording signals on a disc-shaped recording medium using a laser light beam, an optical recording device employing the optical recording method, and an optical recording medium on which signals have been recorded by the optical recording device.

BACKGROUND ART

Among the existing types of the disc-shaped optical recording media, there are a phase-change type optical disc and a magneto-optical disc as a write-once or overwrite (reversible) optical disc. Among recording light sources in optical recording devices employing these optical discs, there is known a semiconductor laser for recording signals on the optical disc and for erasing the recorded signals. The laser light beam radiated from the semiconductor laser may be converged on the optical disc as a small-sized spot with a diameter not larger than 1 $\mu$m.

Among replay-only optical discs, there is a CD-ROM employing a compact disc (CD) as a read-only memory. These CD-ROMs can be duplicated in large quantities. It is contemplated at present to record, on the replay-only optical discs capable of being duplicated in large quantities, such as CD-ROMs, information data for identifying these replay-only optical discs, for example, information data for discriminating whether or not the optical disc is an illicitly duplicated disc, in addition to the information signals, such as audio.

The laser light radiated by the semiconductor laser has a wavelength of 780 nm and is free from ablation. Thus it is not possible to produce a laser light output of an intensity capable of directly recording signals on the replay-only optical disc. Thus, if the identification information is to be recorded on the replay-only optical disc, it is not possible to minutely record the identification information on the replay-only optical disc using the semiconductor laser customarily used as the recording light source.

In view of the above-depicted status of the art, it is an object of the present invention to provide an optical recording method for recording the identification information proper to an optical medium on the recording medium and for reading out the identification information using an optical pickup configured for reading out the information signals recorded on the optical recording medium, an optical recording device for carrying out the optical recording method, and an optical recording medium having the subsidiary information recorded thereon by the optical recording device.

DISCLOSURE OF THE INVENTION

An optical recording method for recording pre-set information on an optical recording medium according to the present invention includes the steps of generating a UV laser light of a wavelength absorbed by the optical recording medium and radiating the UV laser light, and modulating the intensity of the UV laser light for recording the subsidiary information different from the pre-set information recorded in an information recording area of the optical recording medium in an area other than the information recording area.

An optical recording apparatus for recording pre-set information on an optical recording medium according to the present invention includes a laser light source for generating a UV laser light of a wavelength absorbed by the optical recording medium and radiating the UV laser light, means for modulating the intensity of the UV laser light from the laser light source, spot position control means for being moved on the optical recording medium for deciding the position of a spot of the UV light beam converged on the optical recording medium, and scanning means for scanning the optical recording medium with the spot. The subsidiary information different from the pre-set information recorded in an information recording area of the optical recording medium is recorded in an area other than the information recording area.

An optical recording medium having the pre-set information recorded thereon according to the present invention includes an information recording area having the substantial information composed of audio data, video data or character data recorded thereon, and a subsidiary information recording area having the subsidiary information different from the substantial information recorded thereon. The subsidiary information is recorded in the subsidiary information recording area by modulating the UV laser light of a wavelength absorbed by the optical recording medium.

The wavelength of the UV laser light may be 190 to 370 nm.

The UV laser light may be the far-ultraviolet laser light generated by fourth harmonics generation by a neodymium YAG (Nd:YAG) laser, an Nd:YVO$_4$ laser, an Nd:YLF laser or a YAP laser.

The UV laser light may be a laser light from an Ar laser or a He-Cd laser.

The subsidiary information may be the identification information proper to each optical recording medium.

The subsidiary information may be recorded on the optical recording medium using a pre-recorded guide pattern for tracking.

If tracking is done using the guide pattern, the guide pattern may be detected using the light of a wavelength different from that of the laser light.

According to the present invention, since the identification information proper to each optical recording medium is recorded as the subsidiary information in the subsidiary information recording area, having the tracking guide pattern pre-recorded thereon, using the UV laser light, as tracking is done in accordance with the guide pattern with the aid of the light of a wavelength different from that of the UV laser light, the mass-produced optical recording media may be discriminated from one another.

BEST MODE FOR CARRYING OUT THE INVENTION

Figure 1:
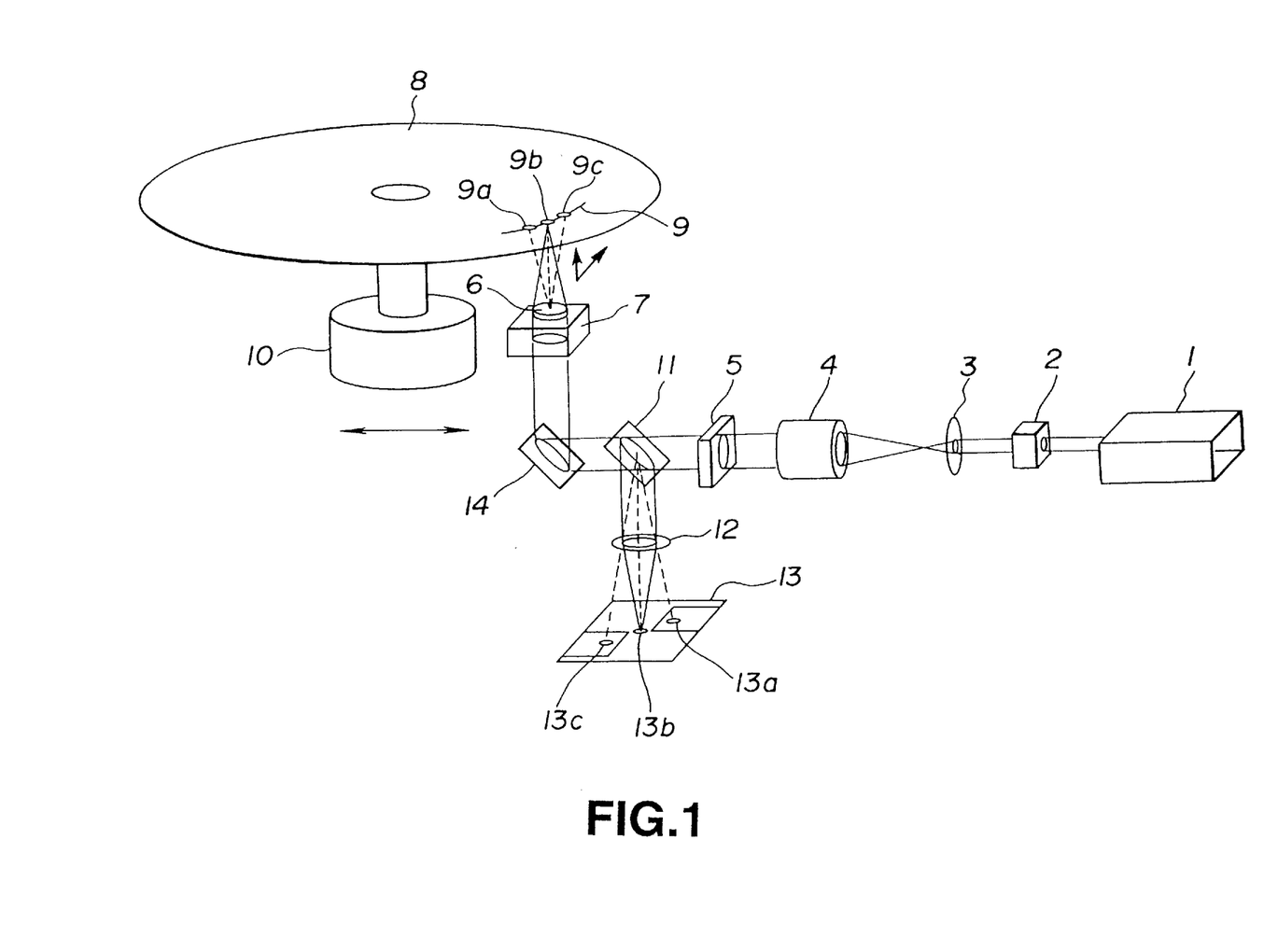
FIG. 1 is a block diagram showing an illustrative construction of an optical recording device according to the present invention.

Referring to the drawings, preferred embodiments of the present invention will be explained in detail. FIG. 1 shows, in a block diagram, an illustrative construction of an optical recording device embodying the present invention.

In the optical recording device of the illustrated embodiment, an ultra-violet laser light source 1, referred to hereinafter as a UV laser light source, capable of radiating a laser light beam of high energy density, is used as a signal recording light source. Specifically, the UV laser light source 1 is a light source radiating a far-ultraviolet laser light by employing generation of fourth harmonics of e.g., a neodymium YAG (Nd:YAG) laser. The light beam of the far-UV laser light and the visible laser light, radiated by the UV laser light source 1, is incident on a light modulator 2 by which the UV laser light is modulated in intensity by the subsidiary information which will be explained subsequently.

The UV laser light beam, modulated in intensity by the light modulator 2, is enlarged by lenses 3, 4 and passed through a phase diffraction lattice 5 so as to fall on a semi-transparent mirror or half-mirror 11. The UV laser light beam, transmitted through the half mirror 11, is reflected by a mirror 14 so as to be converged by an objective lens 6 mounted on a bi-axial actuator 7 so as to be radiated as a light spot on the surface of an optical disc 8.

The optical disc 8 is kept in rotation by a spindle motor 10 which is roughly positioned by e.g. screw feed along the radial direction of the optical disc 8.

The reflected light of the visible laser light from the surface of the optical disc 8 falls on the mirror 14 via the objective lens 6 so as to be reflected thereby to fall on the half-mirror 11. The reflected light incident on the half-mirror 11 is led to a photodetector 13 formed of silicon by a cylindrical lens 12 configured for detecting focusing error signals. The photodetector 13 detects the volume of the incident light and outputs electrical signals based upon the incident light volume. De-tracking signals from a guide groove for tracking 9 may be simultaneously detected using output signals from the photodetector 13.

Focusing error signals and tracking error signals may also be detected from the electrical signals outputted by the photodetector 13. These focusing error signals and tracking error signals are fed back to the biaxial actuator 7 for moving the actuator in a controlled manner so that the UV light spot radiated on the optical disc 8 is focused on the surface of the optical disc 8 at the same time as it is correctly positioned with respect to the guide groove for tracking 9.

The optical disc 8 has a resin substrate formed of light-transmitting materials, such as polycarbonate or acrylic resins. Thus the UV laser light radiated on the optical disc 8 needs to be a laser light beam appropriate for machining the polycarbonate or acrylic resin material. Since polycarbonate and acrylic resins absorb the light having the wavelengths of not more than 290 nm and the light having the wavelengths of not more than 370 nm, respectively, and the UV laser light having the wavelength of not more than 190 nm is absorbed by air, the UV laser light with the wavelength of 190 to 370 nm capable of being satisfactorily absorbed by the substrate of the optical disc 8 and being photodecomposed in a shorter time is preferably employed as the laser light for recording the subsidiary information on the optical disc 8. Thus, in the present embodiment, the subsidiary information is recorded using the UV laser light with the wavelength of 266 nm generated by the fourth harmonics generated by the neodymium YAG laser.

By this UV laser light, the subsidiary information is recorded as pits on the optical disc 8. Specifically, the portions of the disc irradiated with the UV light spot is removed by ablation for forming the pits.

The subsidiary information represents the identification information proper to the optical disc 8 and is comprised of micro-codes employed in coding or in a microprocessor. The contents of the subsidiary information include the information such as the serial number or pass-word of the optical disc 8.

The relation between the UV laser light and the size of the recorded pits is explained in detail. The size of the pit reproducible with a lens having a wavelength of 780 nm and the numerical aperture of 0.45 is not less than 0.87 $\mu$m. If pits are formed by recording on the optical disc 8 with the ablation mode at a sweep velocity of 1 to 4 m/sec, using the UV laser light, with a wavelength of 266 nm, modulated with a high speed with a pulse width of 20 to 200 ns, and a lens having a numerical aperture of 0.4 or less, the size of the pit thus formed by recording is substantially coincident with the size of the pit reproducible with the UV laser light of the wavelength of 780 nm and with the lens having the numerical aperture of 0.45.

For detecting the focusing error signals and tracking error signals using the reflected light from the optical disc 8, the visible laser light with a wavelength of 532 nm generated by the UV laser light source 1 is used simultaneously with a UV laser light beam of a wavelength of 266 nm employed for pit recording in consideration of sensitivity, reaction and light-induced damage of the silicon photodetector 13.

The depth of the tracking guide groove 9 is set to one quarter of the wavelength of 532 nm of the laser light beam so that maximum signal modulation factor will be obtained for the laser light having the wavelength of 532 nm. The depth of the tracking guide groove 9 then becomes equal to one-half the wavelength of 266 nm, so that the signal modulation factor is minimized.

The detection of tracking error signal in the tracking operation is explained.

For detecting the tracking errors, a three-beam method is used. The three beams in the three-beam method are generated by the phase diffraction lattice 5. Thus a synthetic quartz having a high transmission factor of e.g., not lower than 90% for the UV light having the wavelength of 266 nm is employed as a material for the phase diffraction lattice 5. The phase depth of the phase diffraction lattice 5 is set to one-half the wavelength of 532 nm of the laser light so that the UV laser light with the wavelength of 266 nm will be transmitted through the lattice 5 and so that the diffraction efficiency will become maximum for the laser light beam with the wavelength of 532 nm. If the scattering caused by the synthetic quartz is disregarded, the phase depth corresponds to one wavelength for the wavelength of the laser light of 266 nm, thus minimizing the diffraction efficiency.

Although scattering by the synthetic quartz cannot in effect be disregarded, more importance is attached to the minimum diffraction efficiency for the wavelength of 266 nm. It is noted that synthetic quartz needs to be employed not only for the phase diffraction lattice 5 but also for the optical components employed in the optical system excepting a mirror.

The visible laser light, with a wavelength of 532 nm, radiated from the UV laser light source 1, is converted by the phase diffraction lattice 5 into three beams which are then radiated as spots 9a, 9b and 9c on the tracking guide groove 9 formed in the optical disc 8. The reflected light of the visible laser light, radiated as the spots 9a, 9b and 9c, falls on the photodetector 13 as spots 13a, 13b and 13c and the light volumes of the spots 13a, 13b and 13c are detected by the photodetector 13. Although the existing photodetector is not appropriate for promptly detecting the reflected UV laser light from the optical recording medium, focusing and tracking error signals can be detected speedily and accurately with the present optical recording device employing the visible laser light.

Meanwhile, by arranging a pair of four-quadrant photo-detectors in register with the light spots 13a, 13c on the photodetector 13 associated with the light spots 9a, 9c formed by the ±1st order diffracted light, it becomes possible to simultaneously detect focusing error signals and tracking error signal by the astigmatic method employing a cylindrical lens and by the three-beam method, respectively.

That is, although the existing photodetector is not appropriate for speedily detecting the reflected UV laser light from the optical recording medium, the focusing and tracking error signals can be detected speedily and accurately with the present optical recording device employing the visible laser light. In other words, the subsidiary information can be recorded correctly by recording the subsidiary information, with the aid of the UV laser light beam, as focusing control and tracking control are applied with the aid of the visible laser light.

Figure 2:
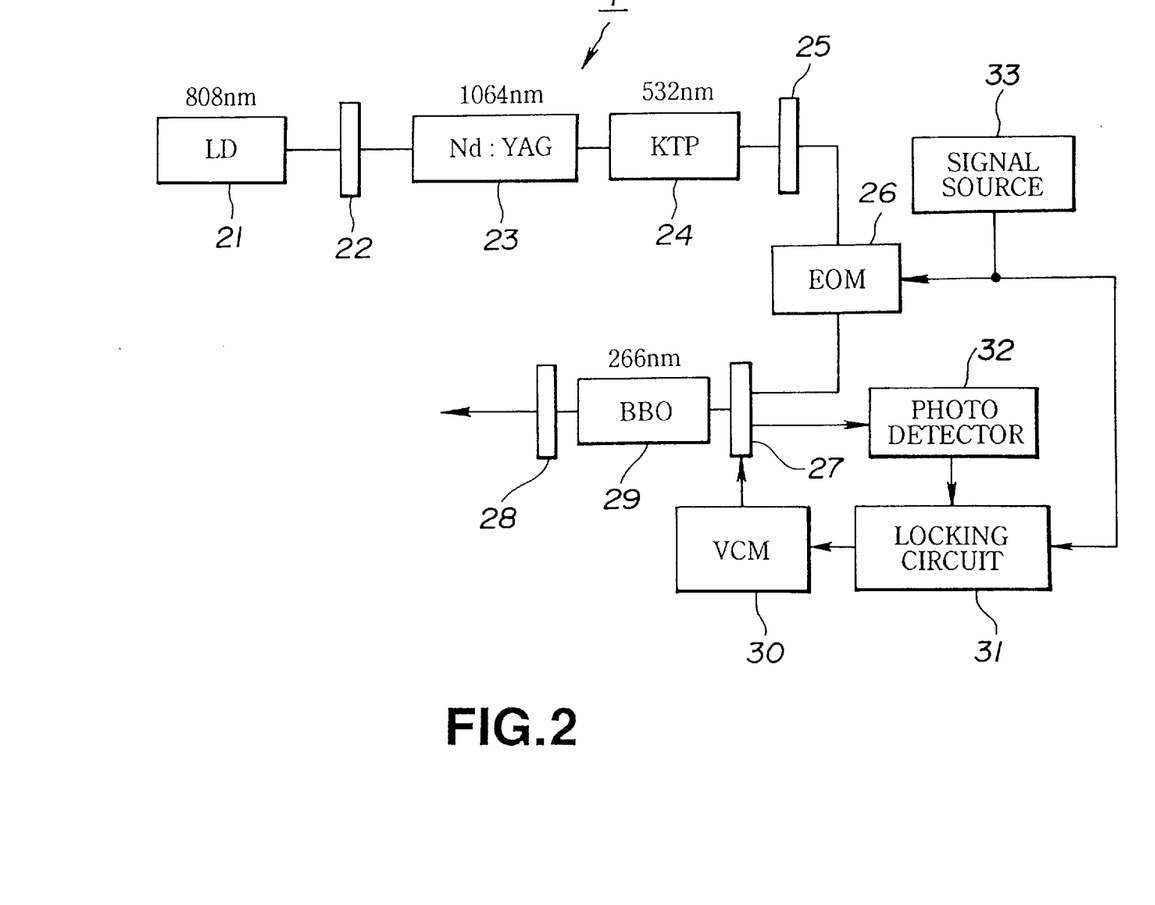
FIG. 2 shows an illustrative arrangement of a UV laser light source constituting the optical recording device.

Referring to FIG. 2, the UV laser light source 1 is explained in detail.

A laser diode 21 is a semiconductor laser radiating the laser light of a wavelength of 808 nm for exciting the neodymium YAG laser. The laser light from the laser diode 21 falls on an external resonator of the neodymium YAG laser. That is, the laser light falls on a crystal of the neodymium YAG laser 23, as a laser medium, via an optical fiber and a mirror 22, for exciting the neodymium-YAG crystal 23. Thus the excited light of the neodymium YAG laser with a wavelength of 1064 nm is radiated from the neodymium-YAG crystal 23.

The produced second harmonics laser light falls on a non-linear optical crystal element 24 of KTP (KTiOPO$_4$) within an external resonator for generating second harmonics (SHG). The laser light of the second harmonics, with a wavelength of 532 nm, generated by SHG, is transmitted through a mirror 25 to fall on an electro-optical modulation (EOM) element 26. The EOM element 26 is employed for high-speed phase modulation of the fourth harmonics laser light, radiated by the UV laser light source, based upon a signal from a signal source 33.

The second harmonics laser light from the EOM element 26 falls on an external resonator constituted by mirrors 27, 28 and a non-linear optical crystal element 29 composed of BBO. That is, the second harmonics laser light falls via the mirror 27 on a non-linear optical crystal element 29 via the mirror 27 to generate fourth harmonics laser light with a wavelength of 266 nm by way of fourth harmonics generation. The fourth harmonics laser light is radiated to outside via the mirror 28.

Since the UV laser light with the wavelength of 266 nm is excited continuously, light intensity modulation may be executed speedily. In addition, since the mode is high in uniformity, the laser light may be condensed easily to a spot with a diameter of not more than 1 µm.

The resonant frequency of the external resonator can be swept by driving the mirror in a controlled manner by a voice coil motor 30. That is, the external resonator is excited into operation at a pre-set frequency in a stabilized state. Specifically, the second harmonics laser light outgoing from the EOM element 26 and reflected light by the mirror 27 is incident on a photodetector 32. The photodetector 32 then converts the incident reflected light into an electrical current which is supplied to a lock circuit 31. The lock circuit 31 detects the position of the mirror 27, based upon the electrical current, and negatively feeds back the position signal of the mirror 27 to the voice coil motor (VCM) 30. The voice coil motor 30 controls the position of the mirror 27, using the position signal transmitted thereto, for locking the resonant frequency of the external resonator. Detailed description of the lock circuit is found in JP Patent Kokai Publication HEI-05-243661 corresponding to U.S. Pat. No. 5,367,531.

Figure 3:
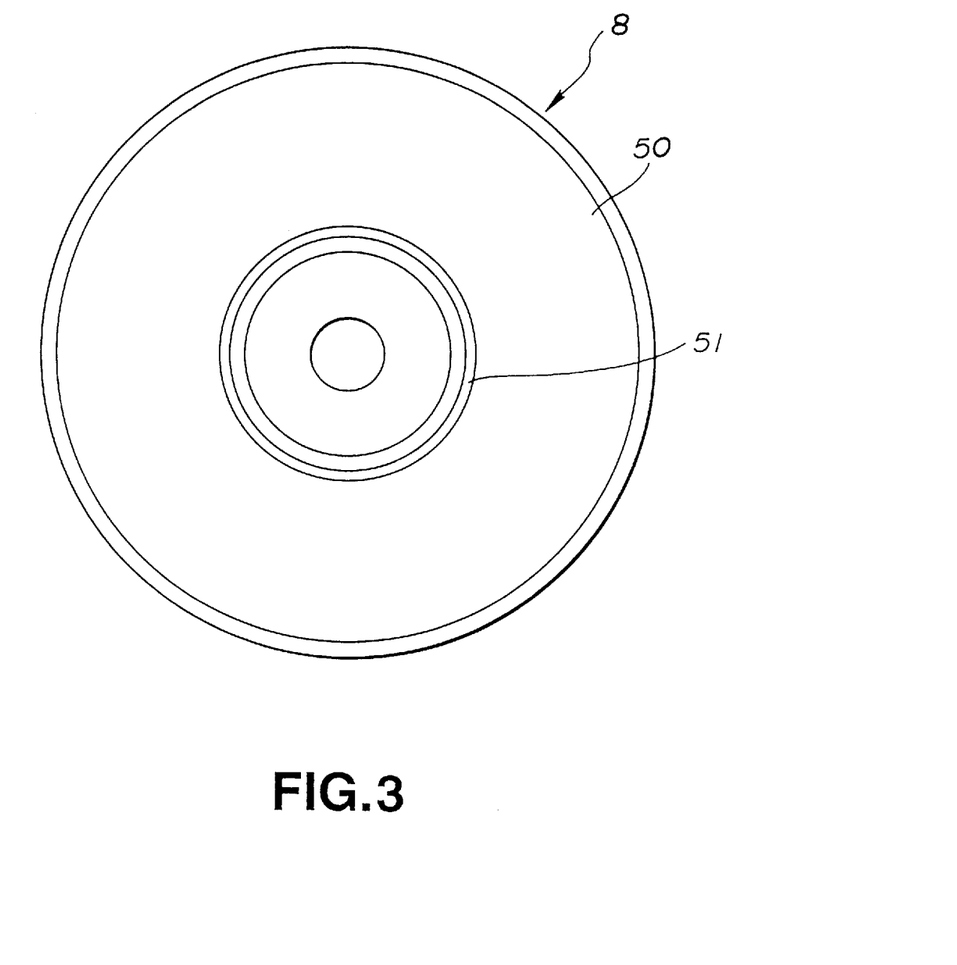
FIG. 3 shows an illustrative recording state of the optical recording medium.

An illustrative example of the recording state of the subsidiary information by the optical disc is shown in FIG. 3.

Information signals, such as audio, video and data, are recorded in the information recording area 50 on the optical disc 8. On the inner peripheral side of the information recording area 50, there is provided a lead-in area as an area for recording the information specifying the contents of the information recorded in the information recording area 50. A subsidiary information recording area 51 for recording the subsidiary information is provided in the lead-in area, and the identification information proper to the optical disc is recorded in the subsidiary information recording area 51.

The subsidiary information recording area 51 need not be in the lead-in area and may be in any other area provided that a guide groove for tracking is formed therein. That is, the guide groove for tracking serves as a guide for writing the identification information on the disc.

The information signals recorded on the optical disc 8 are read out using an optical pickup employing a laser light source such as a semiconductor laser other than the near-infrared laser. The recorded subsidiary information may be reproduced using an optical pickup configured for reproducing the information signals. The read-out signals of the subsidiary information, made up of micro-codes, directly enters a micro-processor, not shown, for discriminating the contents of the information for directly identifying the optical disc.

The optical disc is mass-produced using a stamper. Specifically, a photoresist film is coated on a glass plate, and signals are recorded thereon by laser light and developed to prepare a master disc. A metal mold (stamper) is then fabricated using the master disc. The optical disc, having the information signals recorded thereon, may be produced in large quantities using this stamper. On the surface of the optical disc carrying the recorded information signals, a metal film for reflection is deposited by vacuum deposition and a protective layer of hard resin is formed thereon to complete a duplicated optical disc.

The step of recording the subsidiary information on the optical disc using the far-UV laser light radiated from the UV laser light source 1 is carried out before the step of vacuum deposition of the metal film in the above-described method for producing the optical disc.

In the above-described embodiment, an Nd:YAG laser capable of radiating the laser light with a wavelength of 266 nm by fourth harmonics generation from the laser light with a wavelength of 1064 nm is employed as the UV laser light source. As alternative solid lasers, use may be made of an Nd:YVO$_4$ radiating the laser light by fourth harmonics generation of 266 nm from the laser light of the wavelength of 1064 nm, an Nd:YLF radiating the laser light by fourth harmonics generation of the wavelength of 262 nm from the laser light of the wavelength of 1047 nm and an Nd:YAP radiating the laser light by fourth harmonics generation of the wavelength of 270 nm from the laser light of the wavelength of 1079 nm. Alternatively, as the semiconductor laser light source capable of directly radiating a quadrupled wave, an AlGaAs laser source capable of radiating laser light having the wavelength of 0.78 to 0.86 μm or an InGaAs laser source capable of radiating the laser light having the wavelength of 0.9 to 1.1 μm may be employed. It is also possible to use a laser light from a gas laser source, such as an Ar laser source capable of radiating laser light of the wavelengths of 0.275 μm, 0.306 μm, 0.333 μm, 0.351 μm or 0.364 μm, or a He-Cd laser capable of radiating laser light having the wavelengths of 0.325 μm or 0.354 μm.

Although KTP or BBO (β-BaB$_2$O$_4$) is used in the above-described embodiment as the non-linear optical crystal element, LN, QPM, LN, LBO or KN may also be employed.

In addition, although the three-beam method is employed in the above-described embodiment for detecting focusing and tracking, it is possible to use a skew beam method or a push-pull method for detecting focusing or tracking, respectively.

The optical recording/reproducing apparatus according to the present invention is now explained.

Figure 4:
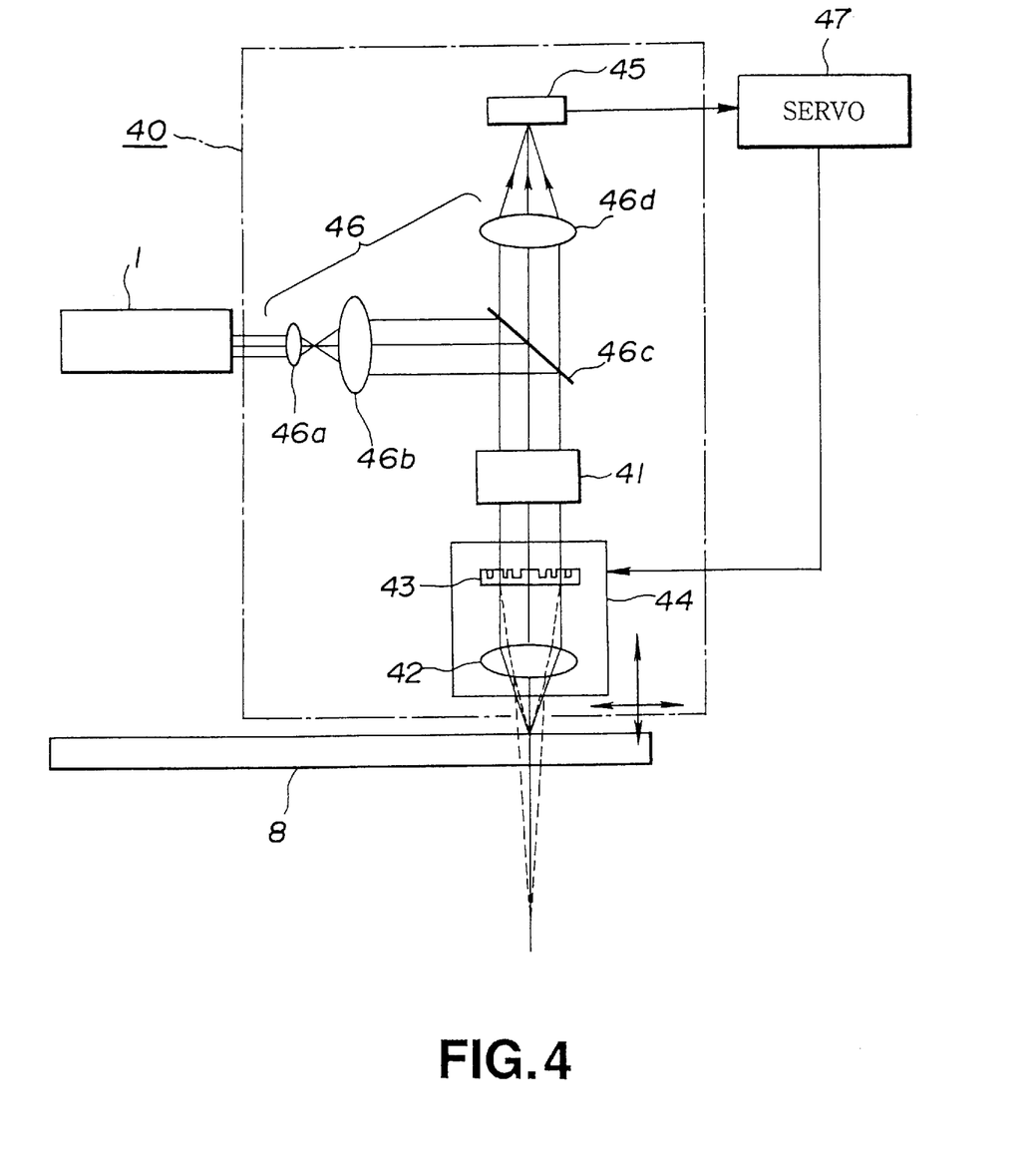
FIG. 4 is a block diagram showing an illustrative construction of an optical recording/reproducing apparatus according to the present invention.

The optical recording/reproducing apparatus includes a UV light source 1, an optical pickup 40 for radiating a light beam outgoing from the UV laser light source 1 on the optical disc 8 and transmitting the reflected light from the optical disc 8 to a photodetector 45, and a servo circuit 47 for effecting servo control based upon output signal of the photodetector 45, as shown in FIG. 4. The parts or components which are the same as those shown in FIG. 1 are depicted by the same reference numerals, and the corresponding description is omitted for simplicity.

The UV laser light source 1 radiates a far-UV laser light in a waveform range of from 200 to 300 nm and a laser light in the visible waveform range of from 400 to 700 nm. The laser light of the far-ultraviolet (far-UV) range is set to a wavelength equal to one-half that of the visible light range, as explained previously.

Referring to FIG. 4, the optical pickup 40 includes a light intensity modulator 41 for modulating the intensity of the laser light from the UV laser light source 1, and an objective lens 42 for converging the laser light on the optical disc 8. The optical pickup also includes a Frenel zone plate (FZP) 43 for converging the laser light of the visible range on the optical disc 8 in a state free from aberration, and a bi-axial actuator 44 for driving the objective lens 42 in a direction along the optical axis and in a direction normal to the optical axis. The optical pickup finally includes a photodetector 45 for detecting the light reflected by the optical disc 8 and transmitted through the objective lens 42, and an optical system 46 for conducting the transmitted light to the photodetector 45.

The laser light outgoing from the UV laser light source 1 is sent to a beam splitter 46c via lenses 46a, 46b constituting a portion of an optical system 46. The lens 46a allows the coherent laser light beam with a small beam spot diameter to pass through its focal point and to the lens 46b for setting the beam spot diameter to a pre-set diameter. The lens 46b collimates the light from the lens 46a and sends the collimated light to the beam splitter 46c.

The beam splitter 46c bends the optical axis of the lens 46b by 90° for directing the laser light towards the optical disc 8. This laser light falls on the light intensity modulator 41.

The light intensity modulator 41 is an optical element exploiting photo-electrical effects by utilizing changes in refractive index caused by impression of electrical voltage. Alternatively, it is an optical element exploiting acousto-optical effects by utilizing the correlation between the sound wave and the light wave passing through the medium. The light incident on the light intensity modulator 41 is modulated in accordance with the subsidiary information supplied from outside, and a 0'th order light of the modulated light is taken out.

The laser light from the light intensity modulator 41 is sent to e.g., the biaxial actuator 44 fitted with the FZP 43 and the objective lens 42 as optical components. The biaxial actuator 44 drives the objective lens 42 in a direction indicated by arrows shown in FIG. 4, that is in a direction along the optical axis of the objective lens 42 and in a direction normal to the optical axis.

Figure 5:
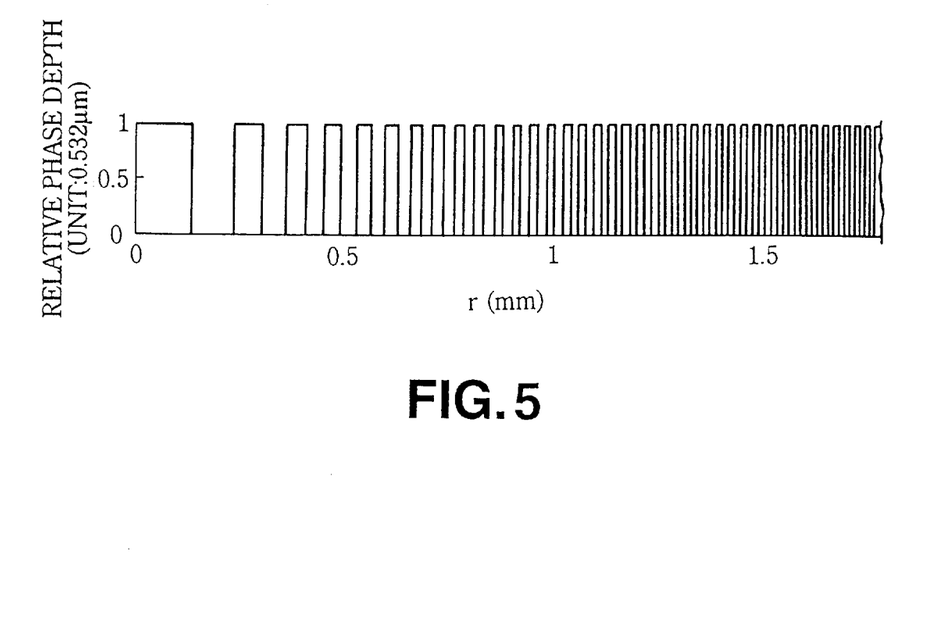
FIG. 5 is a schematic cross-sectional view of an FZP employed in the optical recording/reproducing apparatus.

The FZP 43 is formed of a transparent material exhibiting little absorption in the far-UV range, such as synthesized quartz. The FZP 43 is a concentric phase diffraction lattice formed on the substrate surface. FIG. 5 shows the cross-sectional profile of the phase diffraction lattice.

The FZP 43 is ideally rectangular in cross-sectional shape and has a constant lattice depth without regard to the radial position, as shown in FIG. 5. In addition, the FZP 43 has the lattice period changed depending on the radial position from the center towards the outer rim portion, as shown in FIG. 5. The principle of the FZP 43 will be elucidated subsequently.

The optical disc 8 is irradiated via the objective lens 42 with a laser light corrected by the FZP 43 which functions as a lens in the visible light range and which fails to function as a lens in a band of the far-infra-red range.

The photodetector 45 converts the detected light into electrical signals which are transmitted to the servo circuit 47. The servo circuit 47 finds a signal controlling the operation of the biaxial actuator 44 by the resulting focusing error signals and tracking error signals.

The biaxial actuator 44 shifts the objective lens 42 in the direction along the optical axis and in the direction normal thereto for minimizing the focusing and tracking errors, as described previously. Thus the optical recording/reproducing apparatus exhibits optimum recording characteristics for the far-UV range. Since the information signals are recorded with optimum recording characteristics, and the focusing and tracking control may be carried out with the light in the visible light range, the information signals can be reproduced with optimum playback characteristics.

The principle of the FZP 43 is explained.

It is known that a lens formed of a transparent optical material designed to transmit the light in a defined far-UV range is difficult to use directly for the visible range. For example, if the single lens formed of artificial quartz for the wavelength range of 266 nm is used for the wavelength of 532 nm, the wavelength dispersion of the artificial quartz may be calculated using parameters now to be explained.

As for the wavelength-dependent parameters, the refractive index N is such that refractive index for the wavelength of 266 nm $N_{266}=1.499$ refractive index for the wavelength of 532 nm $N_{532}=1.461$ The increase in the focal length for the wavelength 532 nm of the single lens, caused by such difference in the refractive index, is obtained from the equation (1):

$$(0.499-0.461)/0499=7.7\% \tag{1}$$

Thus, with the focal length of 4.5 mm of the single lens for the wavelength of 266 nm, the increase in the focal length of the single lens for the wavelength of 532 nm is 343 µm. Thus it is seen that a laser light spot with a wavelength of 532 nm is difficult to form on the image plane for the wavelength of 266 nm.

Thus, if the single lens is to be used for the wavelength of 532 nm, it is possible to form a spot on the same image plane if a thin-walled lens having a focal length equal to the focal length of the single lens divided by 7.7(%), referred to herein as a second lens, is used in intimate contact with the single lens. In effect, given the second lens having a constant thickness, the focal length of the second lens is 60 to 70 mm.

If the second lens is constituted by the FZP 43 as shown in FIG. 5, and the lattice has a pre-set depth t equal to 532 nm, the phase depth $\phi$ for the wavelength $\lambda=266$ nm is equal to $2\pi$, as shown by the equation (2):

$$\phi=2\pi(N-1)t/\lambda=2\pi\times0.499\times532/266=2\pi \tag{2}$$

That is, the diffraction efficiency at the wavelength $\lambda=266$ nm of the FZP 43 becomes minimum such that the FZP fails to function as a lens.

On the other hand, the phase depth $\phi$ becomes equal to $0.92\pi$ as indicated by the equation (3):

$$\phi=2\pi(N-1)t/\lambda=2\pi\times0.461\times532/532=0.92\pi \tag{3}$$

That is, in the vicinity of $\phi=\pi$ where the diffraction efficiency becomes maximum, the FZP 43 functions effectively as a lens having a constant focal length.

Figure 6:
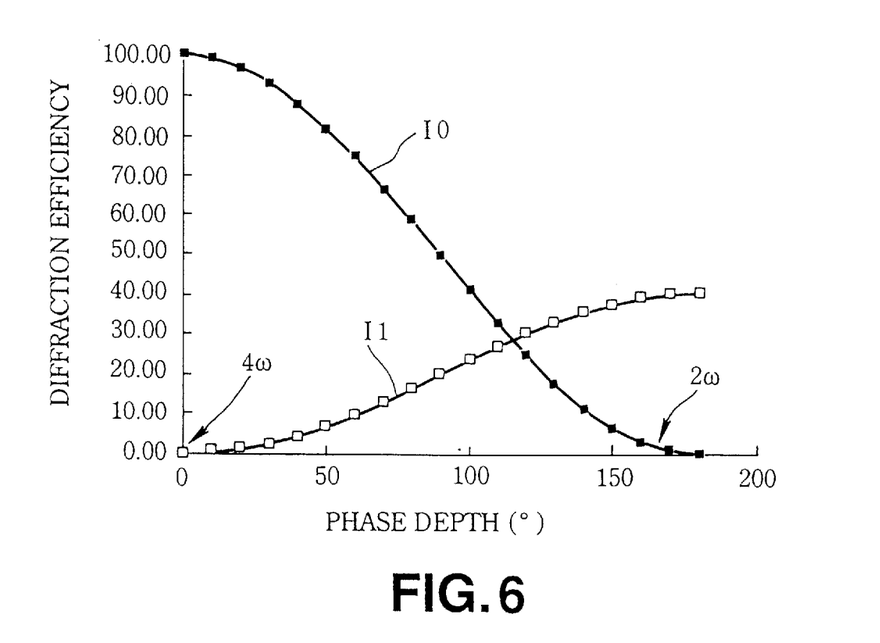
FIG. 6 is a graph showing the relation between the diffraction efficiency and the phase depth in the FZP.

FIG. 6 shows the relation between the phase depth $\phi$, transmittance of the 0'th order light I0 and the diffraction efficiency of the first-order diffracted light I1.

In FIG. 6, arrows $2\omega$, $4\omega$ in FIG. 6 represent the positions of the second harmonics having the wavelength of 532 nm and the fourth harmonics having the wavelength of 266 nm, with the wavelength of 1064 nm being that of the fundamental wave. The phase depth $\phi=2\pi$ for the fourth harmonics of the wavelength of 266 nm is naturally equivalent to $\phi=0$.

If, with the FZP 43 having the focal length f, the radius vector is r and the coefficient is a, the phase depth $\phi(r)$ of the wave surface is given by the equation (4):

$$\phi(r)=ar^2 \tag{4}$$

The phase depth $\phi(r)$ of the FZP 43 is set to 0 and $\phi$ for the range shown in the equation (5):

$$2m\pi-\pi/2<\phi(r)<2m\pi+\pi/2 \tag{5}$$

and otherwise, respectively, where a is a natural number.

The relation between the coefficient a and the focal length f is represented by the equation (6):

$$a=\pi/\lambda f \tag{6}$$

For preparing the FZP 43 with the focal length f=65 mm for the wavelength $\lambda=532$ nm, it suffices to set so that $a=28.92\pi$ from the equation (6).

For producing the FZP 43 having the focal length f=65 mm, for example, for the wavelength $\lambda=532$ nm, it suffices to set $a=28.92\pi$ from the equation (6).

With a lens construction comprised of the objective lens 42 having no aberration for the wavelength $\lambda=532$ nm, the spherical aberration produced on using the lens construction for the wavelength $\lambda=532$ nm is represented by the equation (7):

$$\exp\{-i2\pi(N-1)(Ar^4+Br^6)/\lambda\} \tag{7}$$

The coefficients A and B in the equation (7) are fourth-order and sixth-order coefficients of spherical aberration on polynomial expansion of the spherical aberration. These coefficients of spherical aberration may be calculated using a general-purpose optical design program.

The phase depth $\phi(r)$ of the wave surface represented by the equation (4) may be modified as shown in the equation (8):

$$\phi(r)=ar^2-2\pi(N-1)(Ar^4+Br^6)/\lambda \tag{8}$$

Specifically, since the amount of the spherical aberration in the vicinity of the pupil for the numerical aperture of the objective lens 42 of 0.4 is on the order of $3\lambda$, the FZP 43 can be satisfactorily fabricated by correcting the spherical aberration represented by the equation (7).

Figure 7:
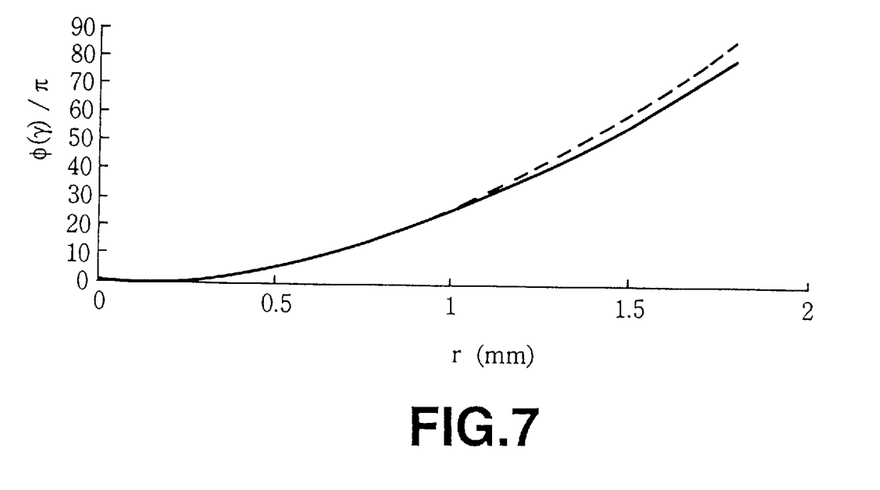
FIG. 7 is a graph showing the relation between the aberration of the FZP before correction and that after correction.

The relation of $\phi(r)$ with respect to the radius vector r may be represented by a broken line specifying the absence of aberration and a solid line representing the post-correction state. It is seen from FIG. 7 that the amount of correction is increased outwardly from r=1 mm as shown for example in FIG. 7.

Figure 8:
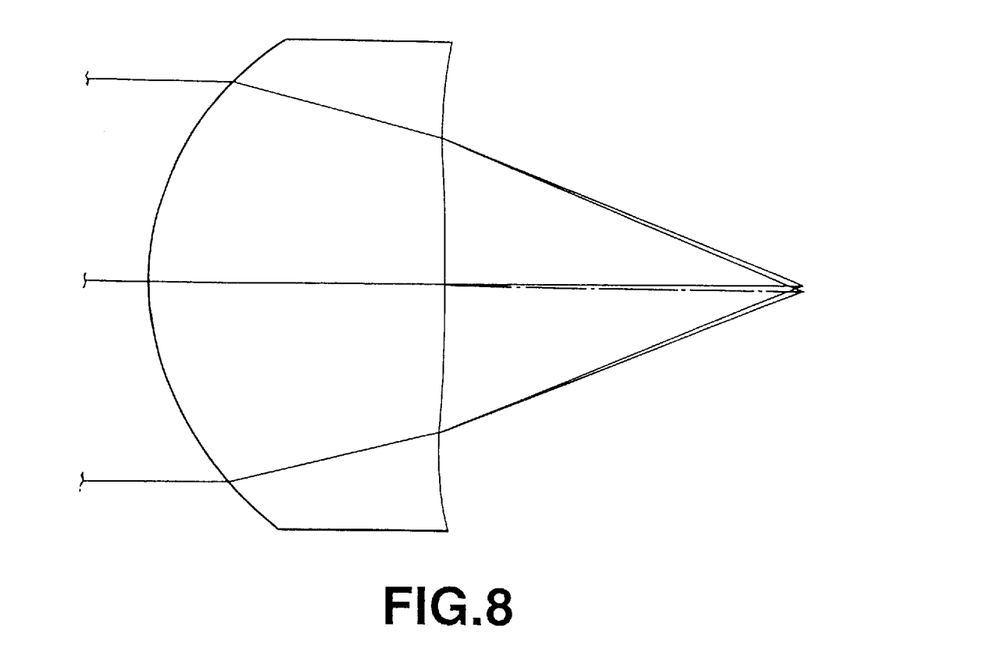
FIG. 8 is a schematic view showing the setting of a non-spherical surface in an objective lens of the optical recording/reproducing apparatus.

An aspherical lens with the numerical aperture of 0.4, which should be corrected by the FZP 43, is represented as shown for example in FIG. 8. The design dimensions of the aspherical lens are as shown in Table 1. It is noted that the focal length and the residual wave front aberration for the wavelength $\lambda=266$ nm are also shown in FIG. 8.

TABLE 1

| | radius of curvature | thickness | refractive index | aspherical coefficient |
|---|---|---|---|---|
| article surface | ∞ | ∞ | | |
| first surface | 2.50144 | 2.500000 | 1.499679 (synthetic quartz) | K: −0.177604<br>A: −0.208109E −02<br>B: −0.244232E −03<br>C: 0.000000E +00<br>D: 0.000000E +00 |
| second surface | −14.83532 | 3.001502 | 1 (air) | K: −175.128050<br>A: −0.166201E − 02<br>B: −0.103811E + 00<br>C: 0.000000 E − 00<br>D: 0.000000 E + 00 |

TABLE 1-continued

| | radius of curvature | thickness | refractive index | aspherical coefficient |
|---|---|---|---|---|
| image surface | ∞ | −0.00006 | | | focal length: 45 mm (λ=266 nm) 4.8675 (λ=532 nm)

wave front aberration on axis: 0.006 rmsλ wave front aberration outside axis: 0.016 rmsλ

Figure 9A:
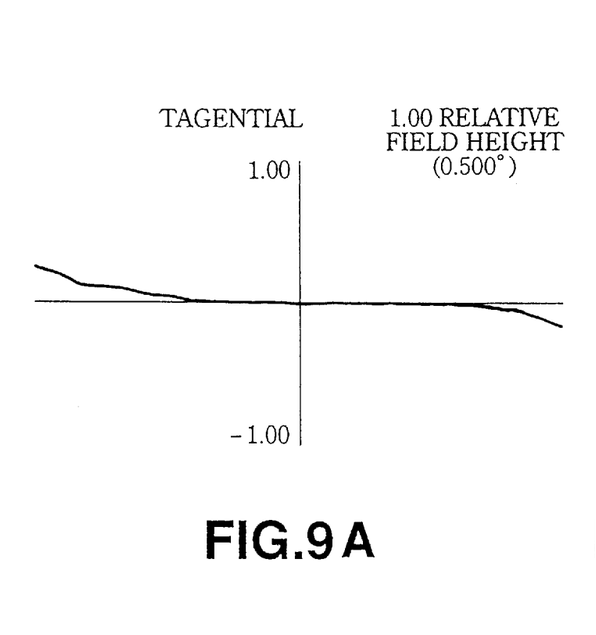
FIGS. 9A, 9B, 9C and 9D are graphs showing the residual wave surface aberration of the wavelength of 532 nm in an objective lens with a numerical aperture of 0.4 after correction with the FZP employed in the optical recording/reproducing apparatus.
Figure 9B:
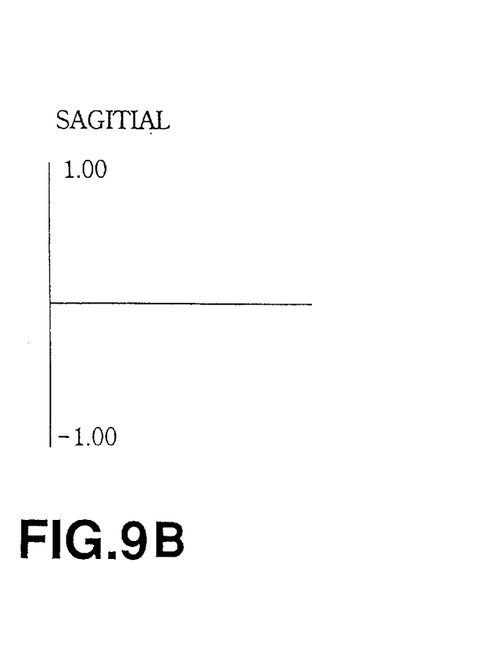

FIGS. 9A and 9B show the residual wave front aberration on allowing the laser light with the wavelength λ=532 nm to fall on the objective lens 42, with the numerical aperture of 0.4, as corrected with the FZP 43. In these figures, the abscissa denotes the relative pupil coordinate of the lens and the ordinate denotes the wave front aberration with the full scale being one wavelength.

Figure 9C:
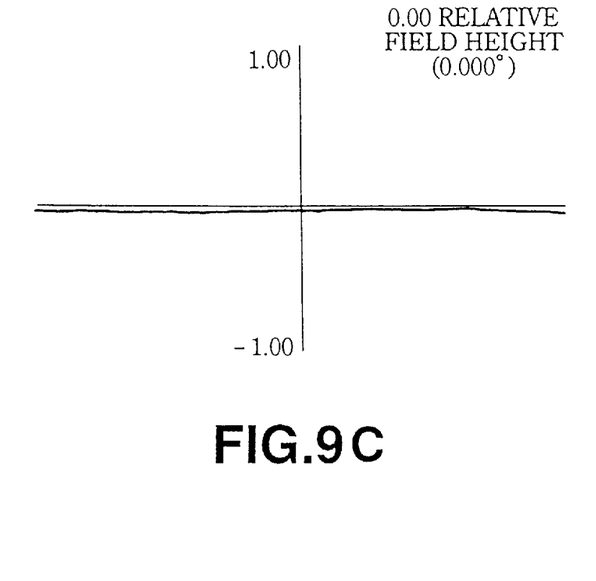
Figure 9D:
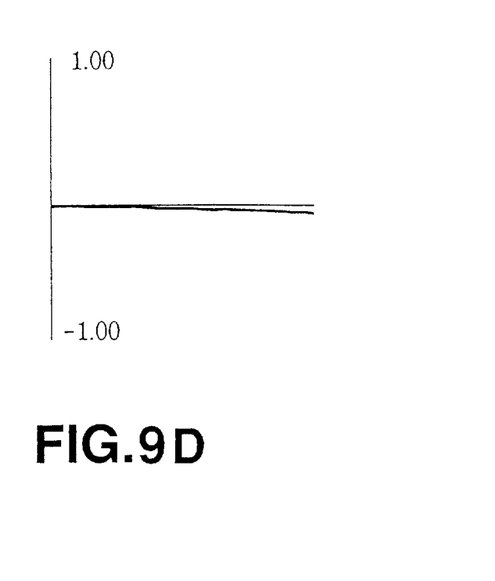

FIGS. 9A and 9B show aberration characteristics in the tangential direction with the image height being 40 μm, and aberration characteristics in the sagittal direction with the image height being 40 μm, respectively. On the other hand, FIGS. 9C and 9D show on-axis aberration characteristics in the tangential direction and on-axis aberration characteristics in the sagittal direction, respectively.

The rms spherical aberration is 0.002λ and 0.029λ on the axis and with the image height of 4040 μm, respectively. These values are satisfactory as characteristics of the optical recording/reproducing apparatus. Before correction of the spherical aberration, the rms spherical aberration is not less than 0..07λ if the numerical aperture is diminished to 0.3.

By constructing the FZP 43 as described previously, it may function as a lens in the visible light range, while failing to function as a lens in the far-UV range. Since deterioration in the visible light range in the characteristics of the lens designed for far-UV light may be compensated in this manner, focusing error and tracking error signals may be obtained using the photodetector 45 by correction in the visible light range without deteriorating light condensing characteristics in the far-UV range, so that sufficient recording characteristics may be achieved for recording.

It will be apparent from the above description that the present invention provides an optical recording method for recording pre-set information on an optical recording medium in which, when a UV laser light of a wavelength absorbed by the optical recording medium is generated and radiated, the intensity of the UV laser light is modulated for recording the subsidiary information different from the pre-set information recorded in an information recording area of the optical recording medium in an area other than the information recording area, thus enabling identification of each optical recording medium.

The present invention also provides an optical recording apparatus for recording pre-set information on an optical recording medium having a laser light source for generating a UV laser light of a wavelength absorbed by the optical recording medium and radiating the UV laser light, means for modulating the intensity of the UV laser light from the laser light source, spot position control means for being moved on the optical recording medium for deciding the position of a spot of the UV light beam converged on the optical recording medium, and scanning means for scanning the optical recording medium with the spot. The subsidiary information different from the pre-set information recorded in an information recording area of the optical recording medium is recorded in an area other than the information recording area. Thus the subsidiary information for identification of each optical recording medium may be recorded on the optical recording medium, so that it can be decided easily whether or not the optical recording medium has been duplicated illicitly, thus prohibiting the optical recording medium from being duplicated illicitly.

The wavelength of the UV laser light is 190 to 370 nm which is appropriate for machining the recording medium thus facilitating recording of the subsidiary information on the optical recording medium.

The present invention also provides an optical recording medium having the pre-set information recorded thereon. The optical recording medium has an information recording area having the substantial information composed of audio data, video data or character data recorded thereon, and a subsidiary information recording area having the subsidiary information different from the substantial information recorded thereon. The subsidiary information is recorded in the subsidiary information recording area by modulating the UV laser light of a wavelength absorbed by the optical recording medium. Thus the subsidiary information is recorded in the subsidiary information recording area in the same configuration as that of the substantial information recorded in the information recording area and may be read out easily using an optical pickup as reading means configured for reading out the substantial information.

Since the subsidiary information is the identification information proper to each recording medium, it becomes possible to identify each optical recording medium.

By recording the subsidiary information on the optical recording medium using the pre-recorded guide pattern for tracking, the subsidiary information may be recorded correctly on the optical recording medium, while the recorded subsidiary information may be read out correctly.

Since the guide pattern may be detected using the light of a wavelength different from the wavelength of the laser light, tracking error signals can be detected promptly and accurately, while the subsidiary information may be recorded at a precise position.

What is claimed is:

1. An optical recording method for recording subsidiary information on an optical recording medium on which pre-set information has been pre-recorded in an information recording area, said method comprising the steps of:

operating a radiation source to generate both UV laser radiation of a wavelength absorbed by said optical recording medium and visible radiation of a wavelength reflected by the optical recording medium; and while the visible radiation is incident on the optical recording medium for servo control, modulating the intensity of said UV laser radiation so as to record the subsidiary information in an area of the optical recording medium other than the information recording area.

2. The optical recording method of claim 1 wherein said UV laser radiation has a wavelength of 190 to 370 nm.

3. The optical recording method of claim 1 wherein said subsidiary information is identification information which identifies the optical recording medium.

4. The optical recording method of claim 1 wherein the visible radiation is incident on a pre-recorded guide pattern for tracking on said optical recording medium.

5. The optical recording method of claim 4 wherein said guide pattern is detected using the visible radiation while tracking is done using said guide pattern.

6. An optical recording apparatus for recording subsidiary information on an optical recording medium on which pre-set information has been pre-recorded in an information recording area, said apparatus comprising:

a laser radiation source configured to generate both UV laser radiation of a wavelength absorbed by said optical recording medium and visible radiation of a wavelength reflected by said optical recording medium, and to radiate said UV laser radiation and said visible radiation;

means for modulating the intensity of the UV laser radiation from said laser radiation source;

spot position control means for being moved relative to said optical recording medium to determine a position of a spot of a beam of the UV radiation converged on said optical recording medium and to direct the visible radiation to the optical recording medium; and scanning means for scanning said optical recording medium with said spot and with the visible radiation, thereby recording the subsidiary information in an area of said optical recording medium other than said information recording area while the visible radiation is incident on the optical recording medium for servo control.

7. The optical recording apparatus of claim 6, wherein said UV laser radiation has a wavelength of 190 to 370 nm.

8. The optical recording apparatus of claim 6, wherein said subsidiary information is identification information which identifies the optical recording medium.

9. The optical recording apparatus of claim 6, wherein said visible radiation is incident on a pre-recorded guide pattern for tracking of the optical recording medium, and a reflected portion of said visible radiation reflects from said guide pattern.

10. The optical recording apparatus of claim 9, also including a means for detecting said guide pattern using the reflected portion of said visible radiation so that tracking can be done using said guide pattern.

11. An optical recording medium having pre-set information and subsidiary information recorded thereon, comprising:

an information recording area in which the pre-set information is recorded, wherein said pre-set information is composed of audio data, video data or character data; and a subsidiary information recording area in which the subsidiary information is recorded, wherein said subsidiary information is identification information which identifies the optical recording medium, and said subsidiary information has been recorded in said subsidiary information recording area by modulating UV laser radiation of a wavelength absorbed by said optical recording medium.

12. The optical recording medium of claim 11, wherein said subsidiary information identifies at least one of a serial number and a password for the optical recording medium.

13. The optical recording medium of claim 11, wherein a guide groove for tracking is pre-recorded in said subsidiary information recording area and wherein said subsidiary information has been recorded using said guide pattern.

14. The optical recording medium of claim 13 wherein the subsidiary information has been recorded while tracking has been performed using said guide pattern, and said guide pattern has been detected using radiation of a wavelength different from the wavelength of said UV laser radiation.

15. The optical recording medium as claimed in claim 11 wherein said subsidiary information is composed of codes or micro-codes.

* * * * *